July 31, 1945.   G. C. CUNNINGHAM   2,380,723
EXTRACTIVE DISTILLATION
Filed Sept. 10, 1942
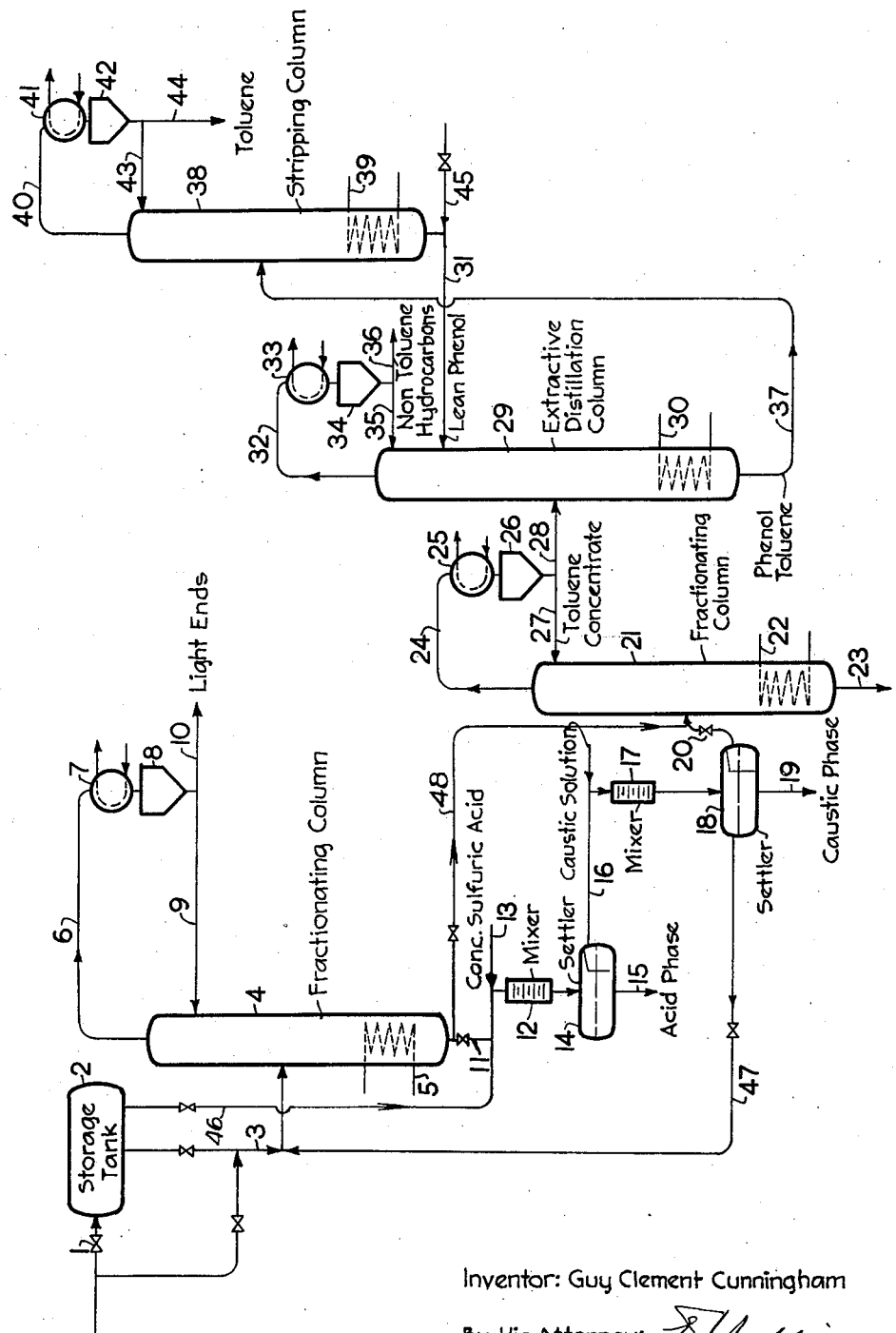
Inventor: Guy Clement Cunningham
By His Attorney:

Patented July 31, 1945

2,380,723

UNITED STATES PATENT OFFICE 2,380,723

EXTRACTIVE DISTILLATION

Guy Clement Cunningham, Scarsdale, N. Y., assignor to Shell Development Company, San Francisco, Calif., a corporation of Delaware Application September 10, 1942, Serial No. 457,875

9 Claims. (Cl. 202—57)

The present invention relates to a distillation process. More particularly, it relates to a process wherein hydrocarbon mixtures containing diolefins are distilled in the presence of relatively high boiling selective solvents.

Heretofore many processes have been proposed for the separation of hydrocarbon mixtures by distillation in the presence of relatively high boiling selective solvents, which processes are generally termed "extractive distillation." In such processes the solvent is utilized to alter the normally existing vapor pressure relationships in such a manner that some of the hydrocarbons whose vapor pressures are relatively increased by the solvent are taken overhead, while those hydrocarbons whose vapor pressures are relatively reduced by the solvent are withdrawn as a bottom product dissolved in the solvent. In ordinary commercial installations these distillations are carried out continuously and the bottom product is distilled or otherwise treated in a separate step to recover solvent from the bottom hydrocarbon product. The recovered solvent is then recycled to the distillation step to exert its vapor pressure-altering effect upon further quantities of hydrocarbon to be distilled. In processes of this type may different relatively high boiling selective solvents are employed, including among others phenol and/or alkyl phenols. These solvents are frequently employed for the separation of various hydrocarbon mixtures of different degrees of saturation; for example, they are especially suitable for the separation of relatively pure aromatic hydrocarbons such as benzene, toluene, the xylenes, etc., from petroleum distillates.

I have now discovered that such phenolic solvents are ordinarily unsuited for the treatment of hydrocarbon fractions in the manner described above, whenever diolefin hydrocarbons are present in the material so treated. Apparently any diolefins present in the feed to such processes react under the conditions of distillation with and in the presence of such solvents to give high boiling products which result in solvent losses and also the introduction of the reaction products thus formed into the distillation system. Although the extent of these reactions is ordinarily slight in the course of any one cycle, nonetheless the continual recirculation of the solvent in the system tends to build up harmful amounts of reaction products as well as cause unduly high solvent losses which in many cases prevent the operation of such distillation systems at satisfactory efficiency and at the same time require frequent shutdowns for cleaning and removal of reaction products, as well as solvent renewal.

In view of the otherwise eminently suitable properties of such phenolic solvents for the separation of hydrocarbon mixtures of different degrees of saturation, as well as their high selectivity and otherwise general stability for use in processes where the solvent is recycled, it is desirable to find some manner of reducing this tendency of these solvents to react with diolefins in order that they may be employed for such separations.

It is an object of my invention to provide a method for reducing the deterioration of phenolic solvents caused by reaction of diolefins with the solvents. Further objects will be apparent from the following.

As stated before, I have discovered that the difficulties encountered when distilling cracked hydrocarbon liquids with phenolic solvents are due to the presence of diolefins which react with the phenol to form a sludge, and that furthermore the reaction is catalyzed by peroxides. My invention therefore comprises subjecting cracked distillates containing diolefins to a treatment capable of removing both diolefins and peroxides such that the diolefin content of the treated distillate as measured by the maleic anhydride value (M.A.V.), as well as the peroxide number, is below certain maximum values. In the absence of peroxides a higher olefin content may be tolerated without detrimental effect due to their catalytic effect on the rate of sludge formation, and the higher the peroxide number the lower is the tolerable amount. As a general rule, it is necessary that the M.A.V. plus 10 times the peroxide number be not greater than than about 10 and preferably below 7, and it is normally desirable to reduce the M.A.V. to 5 or below and the peroxide number to .1 or below. Freshly distilled cracked distillates, although containing diolefins, do not normally contain peroxides. However, upon standing in contact with air such as in ordinary storage tanks, peroxides are quickly developed. Inasmuch as in ordinary refining practice it is usually necessary to employ surge tanks in which peroxides may develop, it is essential that the treatment for the reduction of diolefins also be capable of removing peroxides even though elaborate precautions may have been taken to prevent access of oxygen to the distillate. Frequently oxygen is introduced through pumps and other prime movers in amounts sufficient to develop detrimental amounts of peroxides. Thus it is usual that heat-treated hydrocarbon distillates such as cracked, reformed, hydroformed, polymerized, etc., distillates have M.A.V.'s and peroxide numbers such that the sum of their M.A.V. plus 10 times the peroxide number is above 7 or 10.

Treatments capable of reducing the M.A.V. include in general polymerizing treatments for diolefins, such as treatment with concentrated sulfuric acid at normal atmospheric temperatures, strong aqueous phosphoric acid near its boiling temperature, dilute aqueous phosphoric acid at temperatures of around 200°–250° C., relatively concentrated aqueous solutions of various salts such as zinc chloride, zinc sulfate, etc., clay vapor phase treatment, treatment with anhydrous aluminum chloride, etc. Specific treatments for diolefin removal are those in which the diolefins are condensed with a suitable reagent, such as maleic acid anhydride, formaldehyde, etc., to form higher boiling products. Polymers or condensates, as the case may be, are then removed by fractional distillation. Treatments to reduce the peroxide number include treatment with solid KOH at normal atmospheric temperatures, strong aqueous solutions of alkali metal hydroxides at elevated temperatures, concentrated $H_2SO_4$, sodium hyposulfite, rongalite (complex compound of sodium hyposulfite and formaldehyde), ferrous salts such as ferrous sulfate, ferrous cyanide, etc., alkali metal iodides, and other strong reducing agents.

In general, the most practical treatment comprises contacting with "concentrated," i. e. 90–100%, sulfuric acid under conditions to reduce the M.A.V. to 5 or below consistent with a minimum treating loss due to polymerization of mono-olefins followed by thorough neutralization and redistillation. It is important that the treated distillate coming in contact with the phenol be free from strongly acidic constituents such as free strong mineral acids inasmuch as acids also promote the sludging of phenolic solvents. For this reason, following acid treating, treatment with solid KOH or NaOH is very advantageous and redistillation over alkali metal hydroxide or carbonate, preferably while maintaining as low a distillation temperature as possible, e. g. below 190° C., is desirable.

"Maleic anhydride value," as herein used, may be defined as the number of milligrams of maleic anhydride reacting with 1 gram of oil under specified conditions. The method of determining it is similar to that described by Ellis-Jones in The Analyst, 61, 1936, p. 812, and is as follows:

Pipette 25 ml. of gasoline, 50 ml. of maleic anhydride solution (30 gms. M. A./liter of toluene) and 0.2 ml. of N/10 iodine in toluene into a 200 ml. round bottom flask having a standard taper ground glass joint. Add a few boiling chips, connect the flask to a 12-inch spiral condenser, and reflux the contents gently for one hour. Then, without interrupting the heating, add 5 ml. water through the condenser and continue the refluxing for 15 minutes. Allow the flask and contents to cool to room temperature. Add 5 ml. of ether through the condenser, followed by 20 ml. of water. Remove the flask and transfer its contents by means of a funnel into a 250 ml. g. g. s. separatory funnel. Wash out the flask with 25 ml. ether, in 3 small portions, and then with 25 ml. $H_2O$, also in 3 small portions, adding the washings to the separatory funnel.

Shake the contents of the separatory funnel for 1 minute, allow the phases to separate, and then draw off the lower aqueous layer into a 250 ml. Erlenmeyer flask. Add 5 ml. of water to the separatory funnel and drain it into the Erlenmeyer flask, to wash out the stop cock and funnel stem. Extract the contents of the separatory funnel three times more using 25 ml. portions of water and one-minute shakings, adding the aqueous extract to the Erlenmeyer flask. Titrate the combined aqueous extracts with standard 1 N sodium hydroxide solution to the thymol phthalein end point. Make a blank determination on the maleic anhydride reagent in precisely the same manner, eliminating only the addition of sample.

The M. A. V. is calculated from the expression $$\frac{(B-S) \ N \times 49}{W}$$

where

B = ml. standard alkali required by blank,
S = ml. standard alkali required by sample,
N = normality of standard alkali, and
W = weight sample in grams = ml. sample × specific gravity.

The present invention may be better understood by reference to the drawing which represents a simplified flow diagram of one embodiment of my process. In this process toluene is separated by extractive distillation with the aid of phenol from a cracked gasoline distillate containing diolefins.

The cracked gasoline distillate of high M. A. V. and peroxide number and containing a small amount—say about 3%—toluene passes from cracking units not shown via valved line 1 to storage tank 2 and thence via line 3 to fractionating column 4 equipped with reboiler 5. Column 4 is operated under conditions to take overhead the lighter portion of the fraction to result in a bottom product substantially free from material boiling lower than about 95° C. The overhead vapors pass via line 6 to condenser 7. Condensed vapors collect in accumulator 8 whence a portion is returned to column 4 as reflux via line 9, while the remainder passes to storage not shown via line 10. From the bottom of column 4 is withdrawn the topped hydrocarbon fraction which passes via line 11 to mixer 12. 98% sulfuric acid is admitted to line 11 from line 13. The acid and the hydrocarbon are thoroughly agitated in mixer 12 which may be of the continuous flow type and pass on to settler 14. The lighter hydrocarbon phase and heavier acid phase readily separate. The quantity of acid added via line 13 is also adjusted so that the M. A. V. of the hydrocarbon at this stage is not greater than about 5. Under these conditions, the peroxide number of this particular distillate is reduced to about .06.

The acid phase is withdrawn from settler 14 via line 15, while the hydrocarbon phase of reduced diolefin content passes from settler 14 via line 16 to mixer 17. A 10% aqueous caustic alkali solution is added via line 46 to the hydrocarbon phase in line 16 in sufficient quantity to neutralize residual acid contained in the hydrocarbon phase. The caustic and hydrocarbon phases are thoroughly agitated in mixer 17, and the resulting mixture passes to settler 18 wherein an upper neutralized hydrocarbon phase and a lower aqueous caustic phase separate, the latter being withdrawn from settler 18 via line 19. If desired, the neutralization may be carried out by passing the hydrocarbon from line 16 over solid caustic in a suitable treater not shown, in which case the neutralized hydrocarbon phase (which may advantageously contain a small amount of suspended caustic from settler 18) passes via line 20 to fractionating column 21 equipped with reboiler 22. Column 21 is operated to take overhead all the material boiling lower than about 115° C., while the heavier material is withdrawn from the bottom of column 21 via line 23. The overhead vapors containing most of the toluene originally contained in the feed pass via line 24 to condenser 25. Condensate collects in accumulator 26 whence a portion is returned to column 21 as reflux via line 27, while the remaining toluene concentrate containing about 20% toluene passes via line 28 to extractive distillation column 29 equipped with reboiler 30. Herein the toluene is distilled in the presence of phenol admitted to column 29 via line 31. The phenol flows down the column as the distillation proceeds, selectively dissolving the toluene as the non-toluene vapors pass overhead via line 32 to condenser 33. Condensed vapors collect in accumulator 34 whence a portion is returned to column 29 as reflux via line 35, while the remainder passes to storage not shown. The bottom product comprising phenol containing dissolved toluene passes via line 37 to solvent stripping column 38 equipped with reboiler 39. Herein the toluene is stripped from the phenol, which latter is recycled to column 29 via line 31 to contact further quantities of toluene concentrate in further cycles.

The toluene vapors pass overhead via line 40 to condenser 41. Condensed vapors collect in accumulator 42 whence a portion is returned to column 38 as reflux via line 43 while the remainder passes to storage not shown. Makeup quantities of the phenol may be added to the system via valved line 45.

Instead of treating the bottom product of fractionation column 4 as hereinbefore described, we may treat the incoming feed and redistil it afterwards in columns 4 and 21. In this case, feed from storage tank 2 passes through line 46 directly to the treating plant and treated feed is conveyed from settler 18 through line 47 to fractionation column 4. The bottom product from this column then passes through line 48 directly to column 21, bypassing the treating plant, and is then distilled as described.

In the above description, pumps, heat exchangers, bypasses, valves, flow control equipment, temperature regulators and other auxiliary equipment, the proper placement of which is evident to one skilled in the art, have been omitted for simplicity.

*Example*

Several batches of a toluene concentrate obtained from reformed gasoline, which concentrate had a true boiling range from 95°–125° C., and a toluene content of 20%, an M. A. V. of 25.5 and a peroxide number of 4.0, were subjected to extractive distillation with phenol in a multiplate column, to produce a fat solution containing toluene and a raffinate substantially free from toluene. The fat solution was then redistilled to separate the toluene from the solvent, and the latter was returned to the column.

Different batches of the concentrate were given different treatments. Enough of each batch was extractively distilled to measure the rate of sludging of the phenol. Results are tabulated below:

| Batch | Treatment | M. A. V. | Peroxide No. | Percent sludging per day |
|---|---|---|---|---|
| 1 | None | 32.0 | 4.0 | 3.6 |
| 2 | 3% solid KOH and steam distilled over a 1% aqueous NaOH solution | 32.0 | .2 | 2.1 |
| 3 | 4% of 91% H₂SO₄ neutralized with 10% aqueous caustic soda solution redistilled and stored | 8.6 | 4.6 | 1.1 |
| 4 | Same as 3, but further treated with 3% solid KOH and steam distilled over a 1% aqueous NaOH solution | 8.6 | .3 | .17 |
| 5 | 2% by weight 93% H₂SO₄ neutralized with 10% aqueous NaOH, re-run at reboiler temperature of 150° C | 5.6 | Below .1 | .90 |
| 6 | Same as 5, but further treated with 3.0% solid KOH before re-run | 6.4 | Below .1 | .35 |

As will be noted, batch #5 showed a relatively high rate of sludging in spite of reasonably low M. A. V. and peroxide number. This appears to be due to the presence of some acid liberated upon redistillation. The catalytic effect of traces of strong free mineral acid and the rate of sludging is indicated by the figures below:

| Acid present | M. A. V. | Peroxide No. | Percent sludging per day |
|---|---|---|---|
| None | 32.0 | Below .1 | 2.5 |
| Trace H₂SO₄ | 32.0 | Below .1 | 4.4 |

I claim as my invention:

1. In a process for separating an aromatic hydrocarbon from a gasoline distillate containing it together with more saturated hydrocarbons and diolefins wherein said distillate is distilled in contact with a phenolic solvent under conditions to take overhead said more saturated hydrocarbons and to produce a bottom product of said solvent containing dissolved said aromatic hydrocarbon, and wherein said bottom product is redistilled to separate said aromatic hydrocarbon from said solvent and at least a portion of this separated solvent is returned to contact further quantities of said distillate, the improvement comprising subjecting said distillate to treatment to remove diolefins and to reduce the peroxide number such that the sum of M. A. V. plus 10 times the peroxide number of the treated distillate is below 10, and thereafter distilling the treated distillate in contact with said solvent.

2. The process of claim 1 wherein said aromatic hydrocarbon is toluene and said phenolic solvent is phenol.

3. The process of claim 1 wherein said distillate is derived from petroleum hydrocarbons by a cracking process.

4. The process of claim 1 wherein the sum of the M. A. V. plus 10 times the peroxide number of said distillate is originally greater than 10, and after treatment is below 7.

5. The process of claim 1 wherein said distillate has initially an M. A. V. plus 10 times its peroxide number greater than 7, and after treatment its M. A. V. is below 5 and its peroxide number is below .1.

6. The process of claim 1 wherein said treatment comprises contacting with sulfuric acid of at least 90% concentration.

7. The process of claim 1 wherein said treatment comprises contact with concentrated sulfuric acid followed by treatment with a solid caustic alkali.

8. A process for separating an aromatic hydrocarbon from a relatively wide boiling range gasoline distillate containing said aromatic, together with more saturated hydrocarbons and diolefins, said distillate having a maleic anhydride value plus 10 times peroxide number greater than 7, comprising the steps of treating said distillate under conditions to reduce its maleic anhydride value and peroxide number, fractionally distilling said treated distillate to produce a concentrate of said aromatic having an M. A. V. plus 10 times its peroxide number less than 7, further distilling said concentrate in contact with a phenolic solvent under conditions to take overhead said more saturated hydrocarbons and to withdraw said solvent containing dissolved therein said aromatic hydrocarbon as bottom product, redistilling the latter to separate said aromatic hydrocarbon from said solvent, and returning at least a portion of the separated solvent to contact further quantities of said concentrate.

9. In a process for separating an aromatic hydrocarbon from a gasoline distillate containing it, together with the more saturated hydrocarbons and diolefins, wherein said distillate is distilled in contact with a phenolic solvent under conditions to take overhead said more saturated hydrocarbons and to produce a bottom product of said solvent containing dissolved said aromatic hydrocarbons, and wherein said bottom product is redistilled to separate said aromatic hydrocarbons from said solvent and at least a portion of the separated solvent is returned to contact further quantities of said distillate, the improvement comprising subjecting said distillate to treatment to remove diolefins and to reduce peroxide number such that the sum of M. A. V. plus 10 times the peroxide number of the treated distillate is below 10, said treatment comprising contacting with a mineral acid, separating said acid from the treated distillate, further treating the latter to remove last traces of acid, and thereafter distilling the treated distillate in contact with said solvent.

GUY CLEMENT CUNNINGHAM.